(12) United States Patent
Hill et al.

(10) Patent No.: US 8,287,738 B2
(45) Date of Patent: *Oct. 16, 2012

(54) PROCESS FOR REMOVING IMPURITIES FROM IRON CHLORIDE SOLUTIONS

(75) Inventors: Peter Hill, Woodstown, NJ (US); Mitchell Scott Chinn, Wilmington, DE (US); Ulrich Klabunde, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/760,161

(22) Filed: Apr. 14, 2010

(65) Prior Publication Data

US 2010/0264092 A1    Oct. 21, 2010

Related U.S. Application Data

(60) Provisional application No. 61/171,196, filed on Apr. 21, 2009.

(51) Int. Cl.
*B01D 21/00* (2006.01)
*B01D 21/01* (2006.01)
*C02F 1/52* (2006.01)

(52) U.S. Cl. ......... 210/737; 210/719; 423/140; 423/141

(58) Field of Classification Search ............. 210/719, 210/737, 721, 722, 724; 423/140, 141, 299–304
See application file for complete search history.

(56) References Cited

U.S. PATENT DOCUMENTS

| | | | |
|---|---|---|---|
| 2,446,181 A | 8/1948 | Kraus | |
| 2,701,179 A | 2/1955 | McKinney | |
| 3,591,333 A | 7/1971 | Carlson et al. | |
| 3,975,495 A | 8/1976 | Bowerman | |
| 4,175,110 A * | 11/1979 | Tolley | 423/83 |
| 5,032,367 A | 7/1991 | Hirai et al. | |
| 5,200,159 A * | 4/1993 | Hirai et al. | 423/140 |
| 5,407,650 A * | 4/1995 | Hartmann et al. | 423/50 |
| 6,375,923 B1 * | 4/2002 | Duyvesteyn et al. | 423/610 |
| 8,182,779 B2 * | 5/2012 | Hill | 423/299 |

FOREIGN PATENT DOCUMENTS

| | | |
|---|---|---|
| JP | 63315519 | 12/1988 |
| JP | 63315522 | 12/1988 |

OTHER PUBLICATIONS

Gupta et al., Factors Affecting the Degree of Phosphate-Removal in the System Ferric Chloride-Orthophosphate and Nature of the Precipitates Swiss Fed. Res. Stn. Agric. Chem. Hyg. Environ. 1979.
Glasser et al., "Fluidized Bed Chlorination of Rutile" Society of Mining Engineers of AIME, Sep. 9, 1962.
Barksdale, "Titanium: Its Occurrence, Chemistry and Techology" Ronald Press 1966, pp. 400-462.

* cited by examiner

*Primary Examiner* — Christopher Upton
*Assistant Examiner* — Nader Hossaini
(74) *Attorney, Agent, or Firm* — Daphne Pinto Fickes

(57) ABSTRACT

The disclosure provides a process for removing dissolved niobium, titanium, and zirconium impurities from an iron chloride solution having an iron concentration of about 50 to about 250 grams/liter comprising: (a) heating the iron chloride solution comprising a compound selected from the group consisting of a niobium compound, titanium compound, zirconium compound, and mixtures thereof, in a vessel, at a temperature of about 120° C. to about 300° C., and at least autogenous pressure, to precipitate the compound as a solid; and (b) separating the solid from the iron chloride solution. The separation of the solid is accomplished by filtration, settling, or centrifugation. In one embodiment, the iron chloride solution is a byproduct of the chlorination process for making titanium dioxide.

20 Claims, No Drawings

PROCESS FOR REMOVING IMPURITIES FROM IRON CHLORIDE SOLUTIONS

BACKGROUND OF THE DISCLOSURE

1. Field of the Disclosure

The present disclosure relates to a process for removing impurities from iron chloride solutions, and more particularly to a process for removing dissolved niobium, titanium, and zirconium from iron chloride solutions as filterable products.

2. Background of the Disclosure

In the chloride process for the manufacture of titanium dioxide, acidic metal chloride solutions (containing predominately iron chloride) are formed. These are generally disposed by neutralization, dewatering, and landfill, or deep-welled as hazardous waste. In some cases, the solutions are purified and sold as ferrous chloride or ferric chloride solutions, coagulants for wastewater and potable water treatment. These iron chloride solutions contain chlorides and oxychlorides of titanium, niobium, and zirconium, which slowly precipitate from solution as extremely fine solids. These fine precipitates cause difficulties in filtering the solutions because of very slow filtration rates, or cause problems in storage and handling of the solutions at the customers' sites as the fine precipitates settle and subsequently clog tanks, strainers, and pumping lines. This equipment then needs to be taken out of service for cleaning, incurring costs and interruption of service.

A need thus exists for an improved process for separating impurities such as niobium, titanium, and zirconium from these iron chloride solutions, leaving a stable iron chloride solution that does not precipitate fine solids.

SUMMARY OF THE DISCLOSURE

In a first aspect, the disclosure provides a process for removing dissolved niobium, titanium, and zirconium impurities from an iron chloride solution having an iron concentration of about 50 to about 250 grams/liter comprising:

(a) heating the iron chloride solution comprising a compound selected from the group consisting of a niobium compound, titanium compound, zirconium compound, and mixtures thereof, in a vessel, at a temperature of about 120° C. to about 300° C., and at least autogenous pressure, to precipitate the compound as a solid; and (b) separating the solid from the iron chloride solution.

By "autogenous pressure" is meant a pressure at least partially developed by retaining some vapors produced during the heating. The autogenous pressure will vary with the composition of the iron chloride solution and the degree of volumetric filling of the vessel with iron chloride solution.

In the first aspect, separating the solid from the iron chloride solution is accomplished by filtration, settling, or centrifugation.

In a second aspect, the disclosure provides a process for removing dissolved niobium, titanium, and zirconium impurities from an iron chloride solution having an iron concentration of about 50 to about 250 grams/liter comprising:

(a) reacting ore comprising metal oxides with chlorine and a carbon compound at a temperature of about 900° C. to about 1300° C. to form a gaseous stream comprising chlorides of the metal and off gases comprising carbon oxides;

(b) cooling the gaseous stream to form iron chloride solids along with solids of a compound selected from the group consisting of a niobium compound, titanium compound, zirconium compound, and mixtures thereof;

(c) quenching the solids formed in step (b) to form an iron chloride solution having an iron concentration of about 50 to about 250 grams/liter and a compound selected from the group consisting of a niobium compound, titanium compound, zirconium compound, and mixtures thereof;

(d) heating the iron chloride solution in a vessel, at a temperature of about 120° C. to about 300° C., and at least autogenous pressure, to precipitate the compound as a solid; and (e) separating the solid from the iron chloride solution.

DETAILED DESCRIPTION OF THE DISCLOSURE

Titanium dioxide ($TiO_2$) powder that may be in the rutile or anatase crystalline form is commonly made by either a chloride process or a sulfate process. In the chloride process, titanium tetrachloride ($TiCl_4$) is oxidized to $TiO_2$ powders. The chloride process is described in greater detail in "*The Pigment Handbook*", Vol. 1, 2nd Ed., John Wiley & Sons, NY (1988), the teachings of which are incorporated herein by reference. The powder may be pigmentary, nano or ultrafine particles. Iron chloride solutions, that are a byproduct of the chloride process, contain a major proportion of iron chloride comprising ferrous chloride, ferric chloride, or a mixture thereof in solution with a minor proportion of troublesome precipitate-forming impurities selected from the group consisting of titanium, niobium, and zirconium, and mixtures thereof. Other impurities that do not cause troublesome precipitates to form, such as aluminum, chromium, and vanadium, may also be present in the iron chloride solution. These impurities are generally present at anywhere from about 100 ppm to about 1 percent by weight, based on the entire weight of the iron chloride solution, depending on the ore composition and plant operation. The niobium, titanium, and zirconium impurities react with water over time to form troublesome fine precipitates. It has been found that these impurities can be removed, leaving a stable iron chloride solution, having an iron concentration of about 50 to about 250 grams/liter, more typically 75 to 200 grams/liter, by heating the iron chloride solution resulting from the chloride process and comprising a compound selected from the group consisting of a niobium compound, titanium compound, zirconium compound, iron compound, and mixtures thereof, in a vessel, typically a substantially closed vessel. Some suitable substantially closed vessels include autoclaves or continuous flow pipeline reactors. In one specific embodiment, a 145 mL stirred Hastelloy® C-276 autoclave with a C-276 piston pump capable of generating 1,000 psig may be used in a continuous flow process. The heating is conducted at a temperature of about 120° C. to about 300° C., more typically at a temperature of about 200° C. to about 250° C. This heating occurs at autogenous pressure or higher and for a period of time sufficient to precipitate the compound as a solid. Some suitable pressures include about 200 to about 1400 psig, more typically about 500 to about 800 psig. Some suitable periods of time include about 1 to about 120 minutes, more typically about 3 to about 30 minutes. After heating under the specified conditions, the solid formed is separated, leaving behind an iron chloride solution that is devoid of the troublesome niobium, titanium, and zirconium impurities. The separation of the solid from the iron chloride solution may be accomplished by filtration, settling, or centrifugation. Some suitable equipment used for the separation includes filters, settlers or clarifiers, or centrifuges such as filter presses manufactured by Andritz, clarifiers manufactured by FL Smidth Minerals, or centrifuges manufactured by Alfa Laval. The iron chloride solution thus prepared is stable indefinitely.

In one specific embodiment, the iron chloride solution comprising impurities such as niobium, titanium, and zirconium is obtained during the production of titanium tetrachloride. Ore comprising metal oxides and a carbon compound such as coke are fed into a fluidized bed reactor and reacted in the presence of chlorine to form a gaseous stream comprising the chlorides of metals found in the ore and off gases comprising carbon oxides, and optionally solids such as ore and carbon fines that are entrained in the gaseous stream. The reaction occurs at a temperature of about 900° C. to about 1300° C. to form the corresponding chlorides and off gases comprising carbon oxides such as carbon dioxide and carbon monoxide. The chlorides formed are then cooled in stages to first condense and remove iron chloride and chlorides of other metals other than titanium tetrachloride in the form of solids. These solids may be separated using a spray condenser or a cyclone. This chlorination process is described in more detail in U.S. Pat. Nos. 2,701,179; 3,591,333; 2,446,181 and "*Titanium: Its Occurrence, Chemistry and Technology*", by Jelks Barksdale, Ronald Press (1966). Fluidized bed chlorination is described in more detail in "*Fluidized Bed Chlorination of Rutile*" by Jay Glasser and W. L. Robinson, Society of Mining Engineers of AIME, Sep. 9, 1962.

The solids so separated are then quenched to form an iron chloride solution having an iron concentration of about 50 to about 250 grams/liter and a compound selected from the group consisting of a niobium compound, titanium compound, zirconium compound, and mixtures thereof. Quenching may be accomplished by mixing dilute hydrochloric acid or water with the separated solids. This iron chloride solution is then treated by heating it in a vessel, such as a substantially closed vessel, e.g. an autoclave or a continuous flow pipeline reactor, at a temperature of about 120° C. to about 300° C., more typically at a temperature of about 200° C. to about 250° C. This heating occurs at autogenous pressure or higher and for a period of time sufficient to precipitate the compound as a solid. Some suitable pressures include about 200 to about 1400 psig, more typically about 500 to about 800 psig. Some suitable periods of time include about 1 to about 120 minutes, more typically about 3 to about 30 minutes. The so precipitated solids are then separated from a stable iron chloride solution.

EXAMPLES

The iron chloride feed materials and the products described in the following Examples were analyzed by Inductively Coupled Plasma (ICP), a well-known technique for elemental analysis of metals in solution.

The Capillary Suction Time (CST) measurement was determined using a CST instrument manufactured by Venture Innovations (Houston Tex.). This device measures the time taken by a wetting front to move a predetermined distance through standard samples of absorbent filter paper. The CST is widely used as a rapid measure of filterability of suspensions of solids in liquid.

In the following examples, all parts and percentages are by weight unless otherwise noted.

Example 1

Batch Treatment at 250° C.; Ferrous Chloride Solution 125 mL of ferrous chloride waste deepwell liquor was heated at 250° C. for 2 hours in a Teflon®-lined autoclave in the lab. Pressure during the treatment reached 550 psig. After treatment, the sample was filtered through a nominal 0.22 micron filter and the filtrate analyzed by ICP. The filtered solids were digested and also analyzed by ICP.

Concentrations of Nb, Ti, and Zr in solution dropped significantly; high concentrations of these elements were found in the solids generated in the treatment. The increased concentrations of Cr, Fe, and Ni found in the liquid are believed due to corrosion of several stainless steel fittings in the ceiling of the autoclave.

Table 1 provides the ICP analytical results for the feed and the products of Example 1.

TABLE 1

| ICP analyses, mg/kg | Cr | Fe | Nb | Ni | Ti | Zr |
|---|---|---|---|---|---|---|
| ferrous chloride solution feed | 618 | 62,300 | 251 | 29 | 5,550 | 677 |
| filtrate of ferrous chloride solution after treatment | 2,960 | 72,800 | 16 | 1,630 | 8 | 3 |
| filter cake separated from ferrous chloride solution after treatment | 428 | 2,980 | 10,300 | 1 | 250,000 | 29,000 |

Example 2

Batch Treatment at 250° C.; Ferric Chloride Solution 125 mL of commercial ferric chloride solution produced at a TiO$_2$ plant was filtered through a nominal 0.22 micron filter, and the filtrate heated at 250° C. for 2 hours in a Teflon®-lined autoclave in the lab. Pressure during the treatment reached 750 psig. After treatment, the sample was filtered through a nominal 0.22 micron filter and the liquid analyzed by ICP.

Concentrations of Nb, Ti, and Zr in solution dropped significantly. The increased concentrations of Cr, Fe, and Ni found in the liquid are believed due to corrosion of several stainless steel fittings in the ceiling of the autoclave.

Table 2 provides the ICP analytical results for the feed material and the products of Example 2.

TABLE 2

| ICP analyses, mg/kg | Cr | Fe | Nb | Ni | Ti | Zr |
|---|---|---|---|---|---|---|
| ferric chloride solution feed; filtrate | 51 | 144,000 | 501 | 3 | 3,250 | 1,900 |

TABLE 2-continued

| ICP analyses, mg/kg | Cr | Fe | Nb | Ni | Ti | Zr |
|---|---|---|---|---|---|---|
| filtrate of ferric chloride solution after treatment | 595 | 143,000 | 21 | 394 | 27 | 58 |

The treated ferric chloride solution has remained exceptionally stable after more than 25 months of storage, as evidenced by a lack of visible precipitates.

Comparative Example 1

Boiling at 103° C.; Ferrous Chloride Solution 1000 mL of waste iron chloride was boiled at atmospheric pressure for 16 hours, with the evaporated liquid continually condensed and allowed to drip back into the boiling solution. The solution was agitated with a mechanical stirrer. Nitrogen was continually purged through the apparatus to exclude air. Temperature was measured at 102-103° C. Formation of whitish solids was observed within hours. After treatment, the sample was filtered through a nominal 0.22 micron filter and the filtrate analyzed by ICP.

Concentrations of Nb, Ti, and Zr in solution dropped significantly, but not as much as with heating at higher temperatures. This shows the greater efficacy at higher temperature, at a shorter time.

Table 3 provides the ICP analytical results for the feed and the products of this Comparative Example 1.

TABLE 3

| ICP analyses, mg/kg | Nb | Ti | Zr |
|---|---|---|---|
| ferrous chloride solution feed sample 1 | 199 | 5,480 | 603 |
| filtrate of ferrous chloride solution sample 1 after boiling treatment | 29 | 354 | 36 |
| ferrous chloride solution feed sample 2 | 241 | 5,120 | 622 |
| filtrate of ferrous chloride solution sample 2 after boiling treatment | 23 | 349 | 46 |

Example 3

Continuous Treatment at 150° C. and 250° C.; Ferrous Chloride Solution

Waste iron chloride solution was treated in this work. A 145 mL stirred Hastelloy® C-276 autoclave with a C-276 piston pump capable of generating 1,000 psig was set up to continuously pump ferrous chloride solution through the autoclave. At the exit, a C-276 coil submerged in an ice bath served to quench the reaction. An automatic backpressure regulator at the discharge of the cooling coil served to maintain about 600 psig in the system. 150° C. and 250° C. conditions were tested at residence times from about 5 to 29 minutes. Residence times were calculated by dividing the autoclave volume, 145 mL, by the flowrate in ml/min.

As found in the earlier, 2-hour batch work, 250° C. was very effective in removing Nb, Ti, and Zr, even at residence times as short as 5 minutes. Nb, Ti, and Zr concentrations were reduced at least 1 order of magnitude in as little as 7.3 minutes. Although there are a few anomalies in the data (one of which is likely due to short-circuited flow through the reactor after the inlet dip tube corroded away), it is seen that 250° C. is much more effective than 150° C. at these fairly low residence times.

Table 4 provides the ICP analytical results for the feed material and the products of this Example 3.

TABLE 4

| Autoclave Flow, ml/min | Residence Time, min | Temp, C. | ICP Results Averaged, mg/kg | | |
|---|---|---|---|---|---|
| | | | Zr | Ti | Nb |
| 0 | n/a (feed) | n/a | 689 | 5,490 | 242 |
| 5 | 29.00 | 150 | 191 | 3,150 | 96 |
| 10 | 14.50 | 150 | 39 | 1,053 | 28 |
| 20 | 7.25 | 150 | 685 | 5,175 | 263 |
| 30 | 4.83 | 150 | 670 | 5,430 | 258 |
| 15 | 9.67 | 250 | 1 | 93 | 20 |
| 20 | 7.25 | 250 | 1 | 135 | 17 |
| 25 | 5.80 | 250 | 1 | 126 | 20 |
| 30 | 4.83 | 250 | 11 | 685 | 23 |

Example 4

Batch Treatment at 210° C.

Ferrous chloride solution from a chloride TiO$_2$ plant (before chlorination to ferric chloride solution) was heated to 115° C., 130° C., 150° C., 175° C., and 210° C., being held at each temperature for 10 minutes. The sample was then cooled and centrifuged to remove the solids formed. The feed solution and the treated solution were analyzed by ICP.

Table 5 provides the ICP analytical results for the feed and for the products of this Example 4.

TABLE 5

| ICP analyses, mg/kg | Ti | Zr | Nb |
|---|---|---|---|
| feed | 5,470 | 1,200 | 700 |
| after 210° C. treatment | 23 | 66 | 42 |

Comparative Example 2

Treatment at 65° C.-95° C.

Samples of commercial ferric chloride solution from a chloride TiO$_2$ plant were heated to 65° C., 75° C., and 95° C. and held at these temperatures. Subsamples were periodically removed, centrifuged and/or filtered, and the solutions analyzed for Nb, Ti, and Zr. Capillary suction time (CST) measurement (a measure of filterability, with shorter times indicating better filterability) were also taken on the subsamples.

Table 6 provides the ICP analytical results for the feed and the products of this Comparative Example 2. Table 6 shows that temperatures of 95° C. or less removed the elements of interest only very slowly, and that filterability was adversely affected by this treatment

TABLE 6

| Temp ° C. | Time hrs | Residuals in FeCl3, ppm | | | CST sec | Vacuum filtration rates (0.22 micron nominal filter pore size) |
|---|---|---|---|---|---|---|
| | | Ti | Zr | Nb | | |
| 65 | — | 5,290 | 3,190 | 659 | 340 | |
| | 4 | 4,420 | 2,770 | 326 | 692 | |
| | 8 | 4,900 | 2,820 | 619 | 928 | |
| | 24 | 3,610 | 2,340 | 411 | >3600 | |

TABLE 6-continued

| Temp °C | Time hrs | Residuals in FeCl3, ppm | | | CST sec | Vacuum filtration rates (0.22 micron nominal filter pore size) |
|---|---|---|---|---|---|---|
| | | Ti | Zr | Nb | | |
| | 48 | 3,100 | 2,110 | 326 | >3600 | |
| | 120 | 2,620 | 1,870 | 272 | >3600 | |
| | 168 | 1,720 | 1,280 | 243 | >3600 | 3 mls in 4 hrs |
| | 192 | 1,590 | 1,090 | 221 | >3600 | |
| 75 | — | 3,910 | 2,480 | 643 | 326 | |
| | 4 | 4,420 | 2,770 | 326 | 1,130 | |
| | 8 | 3,960 | 2,450 | 526 | 1,840 | |
| | 24 | 3,350 | 2,170 | 370 | >3600 | |
| | 48 | | | | >3600 | |
| | 120 | 1,540 | 767 | 177 | >3600 | |
| | 168 | 971 | 643 | 160 | >3600 | 3 mls in 4 hrs |
| | 192 | 723 | 439 | 130 | >3600 | |
| 95 | — | 3,970 | 2,460 | 571 | 326 | |
| | 4 | 5,060 | 2,740 | 730 | 1,863 | |
| | 8 | 3,330 | 1,750 | 439 | >3600 | |
| | 24 | 1,640 | 1,030 | 208 | 1,030 | |
| | 48 | 1,030 | 519 | 141 | 650 | |
| | 120 | 488 | 357 | 110 | 480 | |
| | 168 | 397 | 293 | 106 | 385 | 20 mls in 4 hrs |
| | 192 | 327 | 227 | 96 | 385 | |

What is claimed is:

1. A process for removing dissolved niobium, titanium, and zirconium impurities from an iron chloride solution having an iron concentration of about 50 to about 250 grams/liter comprising:
   (a) heating the iron chloride solution comprising a compound selected from the group consisting of a niobium compound, titanium compound, zirconium compound, and mixtures thereof, in a vessel, at a temperature of about 120° C. to about 300° C., and at least autogenous pressure, to precipitate the compound as a solid; and
   (b) separating the solid from the iron chloride solution.

2. The process of claim 1 wherein the separating of the solid is accomplished by filtration, settling, or centrifugation.

3. The process of claim 1 wherein the heating is conducted at a temperature of about 200° C. to about 250° C.

4. The process of claim 1 wherein the at least autogenous pressure is about 200 to about 1400 psig.

5. The process of claim 1 wherein the at least autogenous pressure is about 500 to about 800 psig.

6. The process of claim 1 wherein the iron chloride solution is heated to precipitate the compound as a solid for about 1 to about 120 minutes.

7. The process of claim 6 wherein the iron chloride solution is heated to precipitate the compound as a solid for about 3 to about 30 minutes.

8. The process of claim 1 wherein the vessel is a pipeline reactor.

9. A process for removing dissolved niobium, titanium, and zirconium impurities from an iron chloride solution having an iron concentration of about 50 to about 250 grams/liter comprising:
   (a) reacting ore comprising metal oxides with a chlorine and a carbon compound at a temperature of about 900° C. to about 1300° C. to form a gaseous stream comprising chlorides of the metal and off gases comprising carbon oxides;
   (b) cooling the gaseous stream to form iron chloride solids along with solids of a compound selected from the group consisting of a niobium compound, titanium compound, zirconium compound, and mixtures thereof;
   (c) quenching the solids formed in step (b) to form an iron chloride solution having an iron concentration of about 50 to about 250 grams/liter and a compound selected from the group consisting of a niobium compound, titanium compound, zirconium compound, and mixtures thereof;
   (d) heating the iron chloride solution in a vessel, at a temperature of about 120° C. to about 300° C., and at least autogenous pressure, to precipitate the compound as a solid; and
   (e) separating the solid from the iron chloride solution.

10. The process of claim 9 wherein the carbon compound is coke.

11. The process of claim 9 wherein the solids are separated using a spray condenser or a cyclone.

12. The process of claim 9 wherein the quenching is accomplished by mixing dilute hydrochloric acid or water with the solids.

13. The process of claim 9 wherein the separating of the solid in step (e) is accomplished by filtration, settling, or centrifugation.

14. The process of claim 9 wherein the heating is conducted at a temperature of about 200° C. to about 250° C.

15. The process of claim 9 wherein the at least autogenous pressure is about 200 to about 1400 psig.

16. The process of claim 9 wherein the at least autogenous pressure is about 500 to about 800 psig.

17. The process of claim 9 wherein the iron chloride solution is heated to precipitate the compound as a solid for about 1 to about 120 minutes.

18. The process of claim 17 wherein the iron chloride solution is heated to precipitate the compound as a solid for about 3 to about 30 minutes.

19. The process of claim 9 wherein the vessel is an autoclave or pipeline reactor.

20. The process of claim 9 wherein the gaseous stream further comprises entrained solids and, said entrained solids are removed before step (d).

* * * * *